(12) United States Patent
Kraft (10) Patent No.: US 11,945,553 B2
(45) Date of Patent: Apr. 2, 2024

(54) SYSTEM FOR LAUNCH AND RECOVERY OF A SURFACE VEHICLE

(71) Applicant: Ronald Johannes Kraft, Houston, TX (US)

(72) Inventor: Ronald Johannes Kraft, Houston, TX (US)

(*) Notice: Subject to any disclaimer, the term of this patent is extended or adjusted under 35 U.S.C. 154(b) by 634 days.

(21) Appl. No.: 17/058,291

(22) PCT Filed: May 29, 2019

(86) PCT No.: PCT/NL2019/050313
§ 371 (c)(1),
(2) Date: Nov. 24, 2020

(87) PCT Pub. No.: WO2019/231324
PCT Pub. Date: Dec. 5, 2019

(65) Prior Publication Data
US 2021/0197933 A1    Jul. 1, 2021

Related U.S. Application Data

(60) Provisional application No. 62/762,924, filed on May 29, 2018.

(51) Int. Cl.
| | |
|---|---|
| *B63B 35/40* | (2006.01) |
| *B60L 53/12* | (2019.01) |
| *B60L 53/30* | (2019.01) |
| *B63B 21/20* | (2006.01) |
| *B63B 27/16* | (2006.01) |

(Continued)

(52) U.S. Cl.
CPC .............. *B63B 35/40* (2013.01); *B60L 53/12* (2019.02); *B60L 53/30* (2019.02); *B63B 21/20* (2013.01); *B63B 27/16* (2013.01); *B63B 27/36* (2013.01); *B63C 1/10* (2013.01); *B63C 3/06* (2013.01); *B63C 3/12* (2013.01); *G05D 1/0011* (2013.01);

(Continued)

(58) Field of Classification Search
CPC ... B63B 27/16; B63B 2027/165; B63B 27/36; B63B 35/40; B63B 2035/405; B63B 35/42; B63C 1/10; B63C 3/12
See application file for complete search history.

(56) References Cited

U.S. PATENT DOCUMENTS 5,184,564 A *  2/1993  Robbins .................. B63B 7/082
                                                    114/352
5,222,454 A    6/1993  Meyer
                    (Continued)

FOREIGN PATENT DOCUMENTS

FR          2528005 A1    12/1983
JP       H03231094 A    10/1991
                    (Continued)

OTHER PUBLICATIONS

International Search Report and Written Opinion for the International Patent Application No. PCT/NL2019/050313, dated Aug. 23, 2019, 11 pages.

*Primary Examiner* — Ajay Vasudeva
(74) *Attorney, Agent, or Firm* — KDW Firm PLLC (57) ABSTRACT

System for launch and recovery of a surface vehicle, comprising a floating cradle structure configured to receive the surface vehicle, the cradle structure being bottomless such that contact between a submersed portion of the surface vehicle and the cradle structure is avoided upon receiving the surface vehicle.

15 Claims, 5 Drawing Sheets

(51) Int. Cl.
  *B63B 27/36* (2006.01)
  *B63C 1/10* (2006.01)
  *B63C 3/06* (2006.01)
  *B63C 3/12* (2006.01)
  *G05D 1/00* (2006.01)

(52) U.S. Cl.
  CPC ...... *G05D 1/0088* (2013.01); *B63B 2027/165* (2013.01); *Y02T 10/70* (2013.01)

(56) References Cited

U.S. PATENT DOCUMENTS

| | | | | |
|---|---|---|---|---|
| 5,715,770 | A * | 2/1998 | Heyworth | B63B 21/58 114/249 |
| 5,746,150 | A * | 5/1998 | Beaulac | B63B 35/665 114/77 R |
| 6,883,453 | B1 * | 4/2005 | Mulhern | B63B 35/40 114/253 |
| 7,506,606 | B2 * | 3/2009 | Murphy | B63B 27/10 114/248 |
| 8,568,076 | B1 * | 10/2013 | Harris | B63B 27/34 114/248 |

FOREIGN PATENT DOCUMENTS

| | | |
|---|---|---|
| WO | 0174655 A1 | 10/2001 |
| WO | 2005030571 A2 | 4/2005 |
| WO | WO-2015143491 A1 * 10/2015 | ............ B63B 27/36 |

* cited by examiner

SYSTEM FOR LAUNCH AND RECOVERY OF A SURFACE VEHICLE

This is a national stage application filed under 35 U.S.C. § 371 of pending international application PCT/NL2019/050313, filed May 29, 2019, which claims priority to U.S. Provisional Patent Application No. 62/762,924, filed May 29, 2018, the entirety of which applications are hereby incorporated by reference herein.

The present invention relates to watercrafts, in particular to vehicles that operate on the surface of the water, also known as surface vehicles. Specifically, the present invention relates to a system for launch and recovery of surface vehicles, in particular unmanned surface vehicles or autonomous surface vehicles. Such surface vehicles may be specifically configured to be deployed from so called multi-tasked vessels.

Multi-tasked vessels are vessels that are capable of performing a variety of tasks. Today's multi-tasked vessels may for example carry out hydrographic surveys or counter enemy mines, submarines and fast-attack crafts in littoral waters. Such multi-tasked vessels are commonly moderately sized, fast, surface combatant and must be able to perform a host of secondary missions such as meteorological, oceanographic data recording, intelligence gathering, surveillance, reconnaissance, maritime intercept, special operations support, logistics support, mine clearing and homeland defense. To accomplish such secondary missions, a multi-tasked vessel is commonly provided with smaller unmanned vessels which operate off-board, also known as unmanned surface vehicles (USVs) or autonomous surface vehicles (ASVs), i.e. vehicles that operate on the surface of the water without a crew. These off-board surface vehicles, or off-board vessels, could simultaneously carry out tasks as hydrographic surveys, mine clearing, reconnaissance and delivering special operations forces to shore. USVs have many applications similar to small survey boats but have the advantages of being deployable without a crew. This makes USVs cheap and easy to use.

Typically, a multi-tasked vessel acts as host vessel, i.e. a larger ship, by which the surface vehicles may be launched and recovered. During launch and recovery of surface vehicles from and to the host vessel, safety is of a key concern. In rough seas, recovery is for example hampered by the vertical change or heave of the respective vessels due to waves. The launch and recovery must be done in such a fashion so as to avoid damage to the surface vehicle as well as the host vessel. The act of bringing a surface vehicle on board a larger vessel obviously requires contact. However, colliding with the host vessel or the recovery apparatus, such as a winch, crane cables, or tethers, can damage surface and underwater vehicles.

A great danger involved in the launch or recovery of surface vehicles is discovery by an enemy while the host vessel is vulnerable. Therefore, the launch and recovery of the surface vehicle is preferably carried out while the host vessel is underway, i.e. moving.

In order for a host vessel to efficiently carry out the secondary missions, it is preferable to provide a system that could quickly and efficiently perform launch and recovery of multiple types of surface vehicles. In addition, launch and recovery of such vessels by the host vessel must be possible day or night and in a variety of sea conditions.

One method of recovery involves moving the surface vehicle onto a ramp at the back of the host vessel. The host vessel can either be stationary or moving at a slower speed than the off-board surface vehicle. This method requires a specially designed ramp and ample storage space on the host vessel. The surface vehicle must also have sufficient power to propel itself from the water onto the inclined ramp. In addition, a crane must also be included to lift the off-board surface vehicle of the ramp if more than one recovery is required.

An alternative to a ramp is a deployed lifting device, which requires close contact between the host vessel and the off-board surface vehicle. Such a lifting device comprises typically a cage-like body which is deployed into the water and used to hold the surface vehicle for launch and recovery of the surface vehicle. The launch and recovery using such a lifting device is typically performed by a boom or crane attachment. For such types of boat-lift systems and methods, capture and recovery is difficult in a heavy sea and impossible while the larger host vessel is underway. In addition, a diver is sometimes required to assist in the connection or release of the off-board vessel.

In combat situations, speed and flexibility of the recovery system is paramount for completion of a successful mission. In littoral waters, secrecy and speed require the ability to launch and recover while the host vessel is moving. Furthermore, special operations and reconnaissance launches typically occur at night and in rough seas. Prior art launch and recovery systems however require calm seas and divers to perform the connection between the lift and off-board vessel, as well as good visibility.

Therefore, there is a need for recovering and launching surface vehicles in a quick, reliable and efficient manner, while the host vessel is moving.

Thereto, the invention provides for a system for launch and recovery of a surface vehicle, comprising a floating cradle structure configured to receive the surface vehicle, the cradle structure being bottomless such that contact between a submersed portion of the surface vehicle and the cradle structure is avoided upon receiving the surface vehicle. Since the cradle structure is bottomless and floating, the cradle structure does not have a submersed portion when deployed. Therefore, the cradle structure does not interact with the surrounding water. Consequently, the cradle structure can be deployed and kept onto the surface of the water while the host vessel is moving and, in addition, does not disturb the surrounding water while it is moving along with the host vessel. This allows for a smooth and quick entrance and exit of the surface vehicle into and from the cradle structure, respectively. In addition, the cradle structure being bottomless allows a surface vehicle to enter the cradle freely, i.e. without making any contact with the cradle structure. This further allows for a smooth and quick entrance of the surface vehicle into the cradle structure and a smooth and quick exit of the surface vehicle from the cradle structure. In particular, it allows efficient and reliable launch and recovery of surface vehicles with keel mounted payloads, as these payloads will not be damaged by the cradle structure since collision with cradle is avoided due to the cradle being bottomless. As a further beneficial effect, the cradle structure being bottomless renders it suitable for various types of surface vehicles having different shapes, whereas prior art cage-like lifting devices are specifically designed and shaped for only one specific type of surface vehicle, i.e. of specific size and shape. Preferably, the cradle structure is shaped such that it easily pierces through waves of the water, such that the cradle structure is not disturbed by the waves and a bottom surface of the cradle remains flush with the average water surface level, while it is deployed and kept on the water. Due to one or more of the above-mentioned advantages, surface vehicles can be efficiently and reliably launched and recovered while the host vessel is at speed and under severe weather conditions. It is to be noted that, in the context of the present invention, bottomless means that the cradle structure is substantially completely devoid of any structural element at its underside.

In a preferred embodiment, the cradle structure comprises buoyant members on its outside along at least a part of its periphery. The buoyant members provide buoyancy to the cradle structure. Since the buoyant members are positioned on the outside of the cradle along at least a part of the periphery of the cradle, any interaction or contact between the buoyant members and the surface vehicle is avoided upon launch and recovery. In this manner, any damage to the surface vehicle and the buoyant members is avoided, so that the surface vehicle and the buoyant remain intact and can continue to function properly.

In a preferred embodiment, the system further comprises a lifting structure attached to the cradle structure configured to lift the cradle structure with or without the surface vehicle. In this way, the cradle structure with or without the surface vehicle can be deployed from a deck of the host vessel onto the water, as well as lifted from the water after launch or recovery of surface vehicle. Preferable, the lifting structure is detachable from the cradle structure and suitable to be attached to a hoisting device, preferably a single point hoisting device, such as an onboard (i.e. on the host vessel) crane or davit.

In a preferred embodiment, the cradle structure further comprises on its inside a fixation member configured to engage a side wall of a hull of the surface vehicle and being switchable between an active state, in which the surface vehicle is fixated relative to the cradle structure, and an inactive state, in which the surface vehicle is movable relative to the cradle structure. Hence, the surface vehicle can be fixated with respect to the cradle. Since the position of the surface vehicle is fixed with respect to the cradle structure, various operations in respect of the surface vehicle, such as refueling, inspection or maintenance can be carried out in an automated manner using for instance smart systems, incorporating functions of sensing, actuation, and control, specifically designed for these purposes.

Preferably, a fixating force of the fixation member in the active state is such that the fixation member can support the weight of the surface vehicle. The fixation member thereby functions as a supporting member which is capable of supporting the full weight of the surface vehicle, while the surface vehicle is lifted into or out of the water after recovery or before launch, respectively.

Preferably, the fixation member comprises a magnet configured to engage the side wall of the hull of the surface vehicle in the active state. Use of a magnet as a fixation member has the advantage of being capable of engaging it with the surface vehicle without the need to carry out a complex fixating process using conventional structural fixating means, such as engaging a hook in a ring of the surface vehicle. The magnet allows easy engagement with the surface vehicle's hull by just placing it onto the hull. It is to be noted that the fixation member may comprise, in addition to or alternative to the magnet, a mechanical pin or a vacuum cup configured to engage the side wall of the hull of the surface vehicle in the active state. Preferably, the magnet itself is configured to be switchable between an active state, in which the magnetic field of the magnet is switched on, and an inactive state, in which the magnetic field of the magnet is switched off. In this way, the possible risk of fixating the surface vehicle relative to cradle structure in a undesired position with respect to the surface vehicle, e.g. during an entrance or exit movement in or out of cradle structure, respectively, can be avoided. The magnet being switchable thus allows switching on the magnet in its active state, i.e. to activate the magnet, when the surface vehicle is on its predetermined recovery position inside the cradle structure. More preferably, the magnet comprises a housing inside which a magnet member can be moved pneumatically or hydraulically away from and towards the cradle structure so as to activate and de-activate the magnet for coupling and de-coupling the surface vehicle relative to the cradle structure, respectively. Additionally or alternatively, the magnet is a switchable electromagnet or a stack of at least two permanent magnet members, which can be rotated with respect to each other along a common rotation axis so as to switch the magnet between its active and inactive states.

Preferably, the fixation member is movable relative to the structure, wherein the fixation member moves towards the side wall of the surface vehicle when it is switched to the active state, and moves away from the side wall of the surface vehicle when it is switched to the inactive state. A movable fixating structure allows for more clearance between the cradle structure and the surface vehicle to be captured inside and launched from the cradle structure, as compared to a fixating member which is not movable relative to the structure. In turn, this allows for a smooth and quick launch and recovery of the surface vehicle from and into the cradle structure while avoiding any damage to the surface vehicle due to collision with the cradle structure.

Preferably, the fixation member comprises a hydraulic or pneumatic member configured to move the fixation member towards and away from the side wall. Such a hydraulic or pneumatic member can provide sufficient force to ensure that the fixation member remains engaged with the surface vehicle, in particular when it is lifted into or out of the water. It is to be noted that the fixation member may comprise, in addition to or alternative to the hydraulic or pneumatic member, an electric member and/or vacuum member configured to move the fixation member towards and away from the side wall.

In a preferred embodiment, the cradle structure is shaped substantially in accordance with an exterior shape of the surface vehicle to be received and comprises a surface vehicle entrance opening on one end. A beneficial effect of such a cradle structure, which is shaped substantially in accordance with the surface vehicle with the exterior shape of the surface vehicle to be received, is that the surface vehicle can be tightly enclosed, which further facilitates fixating and supporting the surface vehicles for carrying out automated operations, such as refueling, inspection, maintenance and/or data transmission with respect to the surface vehicle as well as lifting the surface vehicle using the cradle structure.

In a preferred embodiment, the system further comprises a gate configured to at least partially close off the entrance opening. This allows for an enlarged opening through which the surface vehicle can enter and leave the cradle structure, i.e. more clearance between the cradle structure and the surface vehicle to be received, while realizing a tightly enclosing cradle structure when the surface vehicle is inside the cradle structure, thereby maintaining the beneficial effect of further facilitated fixating and supporting due to the shape of the cradle structure corresponding to the shape of the exterior of the surface vehicle. Preferably, the system comprises sensors configured to sense whether or not the surface vehicle is inside the cradle structure and to automatically activate a locking system to close off the entrance opening, preferably using door-like members connected to ends of side walls of the cradle structure which define the entrance opening.

In a preferred embodiment, the cradle structure further comprises guiding means configured to guide the surface vehicle into the cradle structure, so as to ensure a proper engagement between the fixation member and the surface vehicle. Such guiding means may be a guiding rail, e.g. a mechanic or a magnetic rail, or a smart guiding system using sensors, actuators and/or controllers. Preferably, the guiding means at least partially support the weight of the surface vehicle. Consequently, the guiding means can assist the lifting structure and/or fixation member in lifting the cradle structure with or without the surface vehicle. It is to be noted that the guiding means may also function as an alignment means for aligning the surface vehicle with the cradle structure and/or other system elements or devices, such as an optional energy replenishment system.

In a preferred embodiment, the system further comprises a homing system configured to emit a homing signal for the surface vehicle to estimate the system's position, said homing system comprising communication means for transmitting and/or receiving electromagnetic waves to and from the surface vehicle, respectively, and configured to guide the surface vehicle to the system. Such homing system allows for unmanned surface vehicles to find the cradle structure and enter the cradle structure autonomously, preferably using transponders arranged on the surface vehicle. This allows guiding and receiving the surface vehicle inside the cradle structure, also known as docking, without the support of personnel, in particular divers, which may otherwise be at risk in hostile environments and/or rough water conditions. Preferably, the homing system is further configured to take over the steering and the engine control of the surface vehicle, such that the homing system can move the surface vehicle to inside the cradle structure.

In a preferred embodiment, the system further comprises an energy replenishment system configured to replenish the surface vehicle and operable by automated or remote control. Such energy replenishment provides the host vessel the capability to replenish one or more surface vehicles without the need to bring the surface vehicle(s) aboard the host vessel. This enhances mission efficiency. The benefits further include increased surface vehicle mission time, reduced host vessel exposure time and less risk to personnel involved in a recovery and/or energy replenishment operation. No divers need to be deployed to make connections and the host vessel can maintain its cruising speed.

In a preferred embodiment, the energy replenishment system comprises a connector for connecting a supply of the energy replenishment system to the surface vehicle and an actuator for moving and controlling the connector towards an energy replenishment inlet of the surface vehicle. Consequently, this allows for the connector to connect with the surface vehicle automatically or by remote control. Preferably, the connector and actuator are configured to permit the surface vehicle to approach and dock with the energy replenishment station from any angle. This way, the connection between the supply of the energy replenishment system and the surface vehicle is independent of the position of the surface vehicle inside the cradle structure. Therefore, the energy replenishment system can be operated any time, even in rough weather and/or sea conditions. This further contributes to a quick, reliable and efficient launch and recovery operation.

In a preferred embodiment, the energy replenishment system comprises a fossil fuel station and wherein the connector comprises a fuel nozzle.

In an alternative or further preferred embodiment, the energy replenishment system comprises an electric charging station. Preferably, the charging station comprises a charging contact, ground contacts and an infrared (IR) emitter.

In a preferred embodiment, the charging station is configured for inductive charging. Preferably, the charging station comprises thereto an induction coil configured to create an alternating electromagnetic field, co-operating with a second induction coil in the surface vehicle, e.g. in the hull thereof, which takes power from the electromagnetic field and converts it into electric current to charge a battery of the surface vehicle. As a result, complex control and connection of a connector of the energy replenishment system with the surface vehicle can be omitted. The induction coil of the surface vehicle only needs to be in the vicinity of the induction coil of the charging station. More preferably, the charging station uses resonant inductive coupling. In this way, greater distances between the charging station and the surface vehicle coils can be tolerated during charging.

In a preferred embodiment, the lifting structure comprises a coupling member for coupling a hoisting line of a hoisting apparatus on the host vessel, such as a davit or onboard crane, to the lifting structure, wherein an exterior shape of the coupling member corresponds to an interior shape of a receiving member of the hoisting apparatus, or vice versa, such that the cradle structure is lockable against rotational movement around the hoisting line upon lifting the cradle structure with or without the surface vehicle. As a result, the cradle structure has a fixed predetermined XY-orientation with respect to the host vessel when lifted. In this way, since the surface vehicle inside the cradle structure also has this fixed predetermined XY-orientation with respect to the host vessel when it is lifted out of the water, the surface vehicle can be placed onto the deck of the host vessel without the need to carry out complex maneuvering steps to correctly position the surface vehicle onto the deck. As a further advantage, since the XY-orientation of the surface vehicle is fixed, multiple surface vehicles can be arranged quickly and efficiently on the deck of the host vessel after recovery and lifted from the deck quickly and efficiently during deployment of the surface vehicles onto the water. Moreover, it allows for densely parking/storing the surface vehicles on the deck, so that the deck space required for parking/storing surface vehicles is minimized, which is very beneficial since space is at a premium aboard a multi-tasked vessel, such as a combat ship. The tethering means thus further contribute to a quick, reliable and efficient launch and recovery operation.

In a preferred embodiment, the cradle structure comprises a painter line on the bow of the cradle structure configured to be connected the host vessel. In this way, the cradle structure can be connected to the host vessel, so that the relative position of the cradle structure to the host vessel can be kept constant, i.e. they can move at the same speed. In a preferred embodiment, the surface vehicle is an unmanned and/or autonomous surface vehicle.

The above-described embodiments allow for a quick, reliable and efficient launch and recovery of (unmanned) surface vehicles while the host vessel is at speed and under severe weather conditions. In addition, the use of divers is avoided. Moreover, a minimum of deck space is required and the system allows for the recovery of off-board surface vehicles with a minimum of complexity and the use of different hoisting means. Preferably, the system comprises one or more sensors and a programmable logic controller (PLC) or programmable controller, which are configured to control one of the group containing: the fixation member, e.g. the magnet, the gate, the homing system, the energy replenishment system, the davit, the coupling of the hoisting line to the lifting structure, the painter line winch or reel and the coupling of painter line to the surface vehicle. The sensors and the programmable (logic) controller enable further automation of the system, which further allows for a quicker, more reliable and more efficient launch and recovery of (unmanned) surface vehicles from and to a (moving) host vessel.

Further advantages, features and details of the system according to the present invention are elucidated on the basis of the following description of preferred embodiments thereof with reference to the accompanying drawings, in which.

FIGS. 1 to 10 show a system 10, also known as a dock, for launch and recovery of an unmanned and/or autonomous surface vehicle 30. The system 10 comprises a floating cradle structure 11, formed by two elongate wall-like members extending substantially parallel to each other and extending towards each other at one end, the cradle structure 11 thereby being configured to form a receiving space for receiving the unmanned surface vehicle 30 therein. The cradle structure 11 is bottomless, i.e. it does not have any structural elements on its sea/water facing side. In this way, any contact between a submersed portion 31 of the surface vehicle 30 and the cradle structure 11 is avoided upon receiving the surface vehicle 30.

To provide buoyancy to the cradle structure 11, the cradle structure 11 comprises buoyant members 12, which are located on the outside of the cradle structure 11 along its periphery, so that any interaction or contact between the buoyant members 12 and the surface vehicle 30 is avoided upon launch and recovery.

The system 10 further comprises a lifting structure 13 attached to the cradle structure 11 which is configured to lift the cradle structure 11 with or without the surface vehicle 30. The lifting structure 13 is configured such that any interaction between the surface vehicle 30 and the lifting structure 13 is avoided during launch and recovery, i.e. upon receipt and release, of the surface vehicle 30. The lifting structure 13 furthermore has a bow support 40 for support the bow of the surface vehicle 30 during a lifting operation of the surface vehicle 30. Moreover, the lifting structure 13 is arranged at its top to be able to be coupled to tethering means to hoist the cradle structure 11 with the surface vehicle 30 in and out of the water.

On the inside of each of the elongate wall-like members of the cradle structure 11 two opposite fixation members 14 are arranged, which are configured to engage opposite side walls 32 of the hull 33 of the surface vehicle 30. The fixation members 14 are switchable between an active state, in which the surface vehicle 30 is attached to both wall-like members of the cradle structure 11 and thereby fixated relative to the cradle structure 11, and an inactive state, in which the surface vehicle 30 is free/detached from both wall-like members and thereby movable relative to the cradle structure 11. The fixating force of the fixation members 14 in the active state is such that the fixation members 14 are capable of supporting the weight of the surface vehicle 30.

Figure 3:
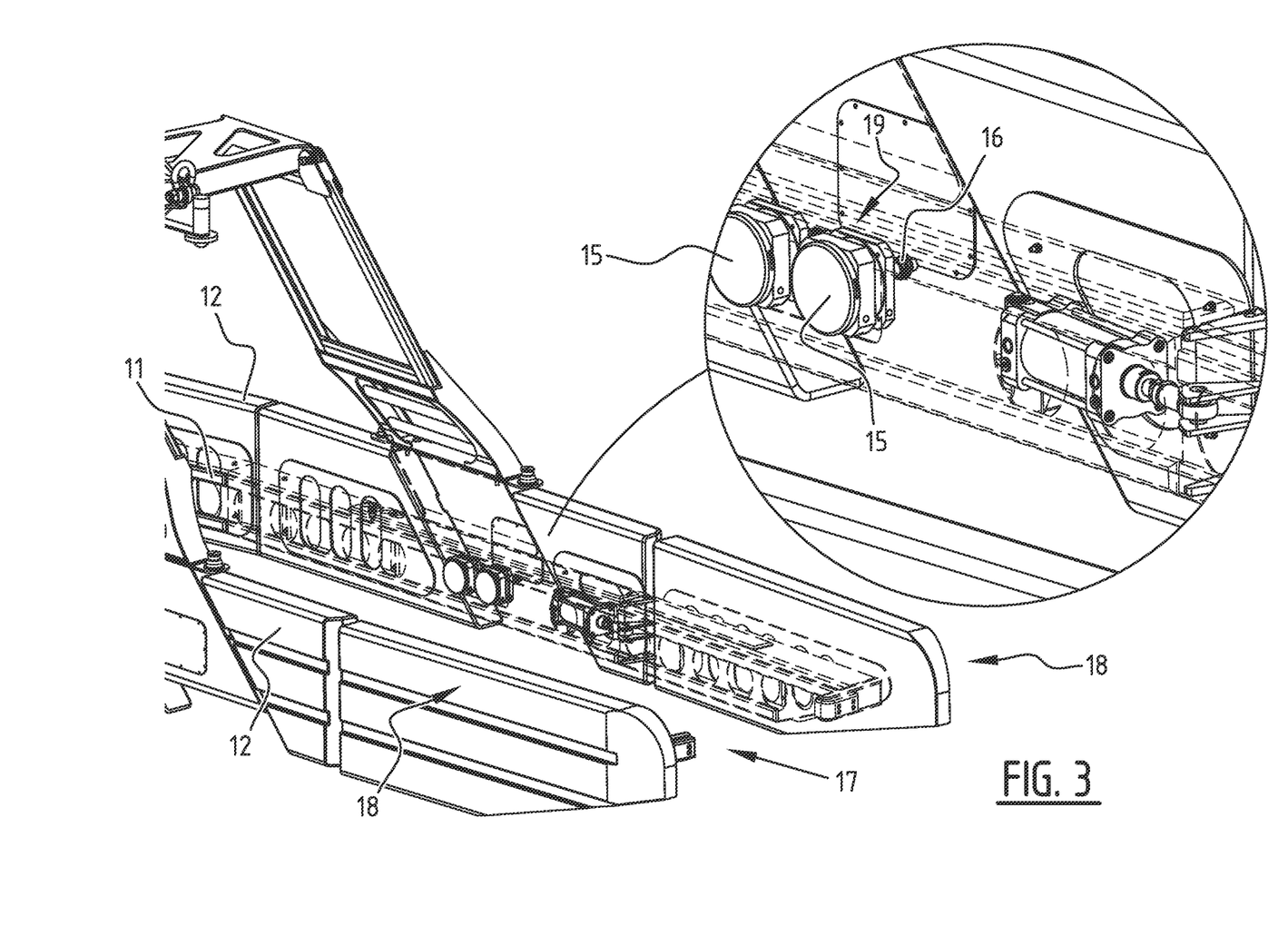
FIG. 3 shows a perspective view of a detail of an inner side of the cradle structure of the system as shown in FIG. 1.

As shown in FIG. 3, the fixation members 14 are formed by magnets 15. These magnets 15 are configured to engage the side walls 32 of the hull 33 of the surface vehicle 30 in their active state.

Figures 8A, 8B:
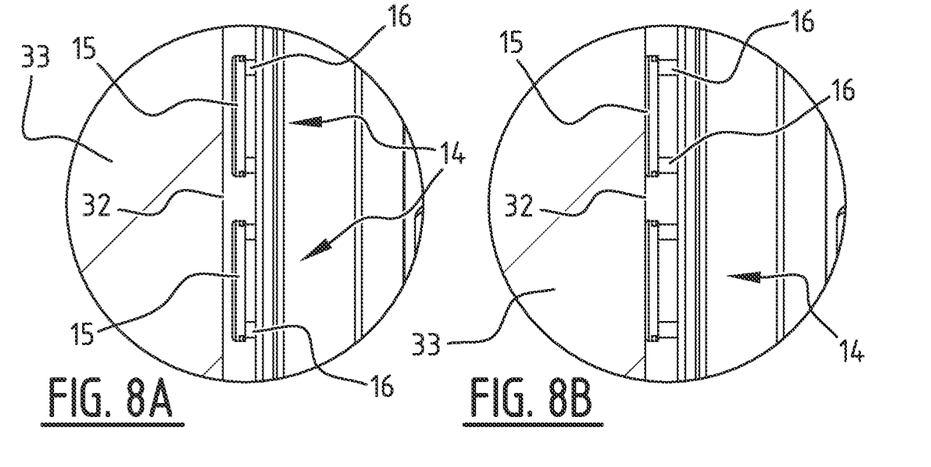
FIG. 8A shows a detail of the system as shown in FIG. 6.
FIG. 8B shows a detail of the system as shown in FIG. 7.
Figure 9:
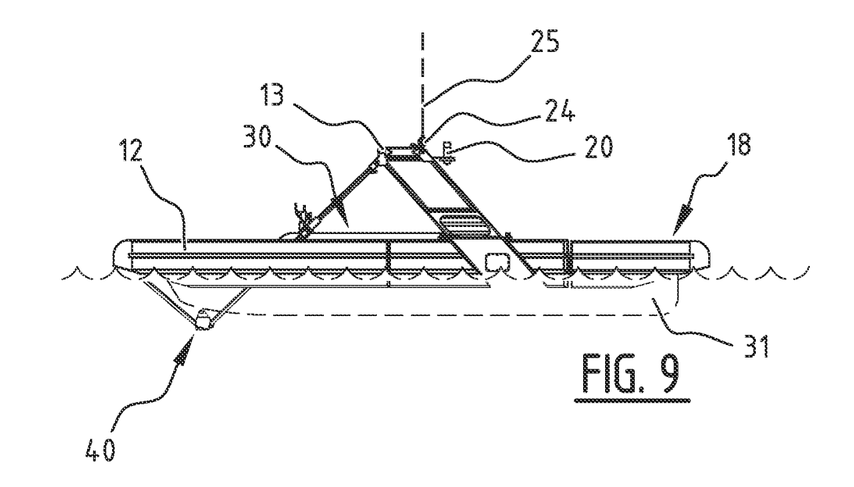
FIGS. 9 and 10 show side views of the system, wherein a surface vehicle is present in the cradle structure.
Figure 10:
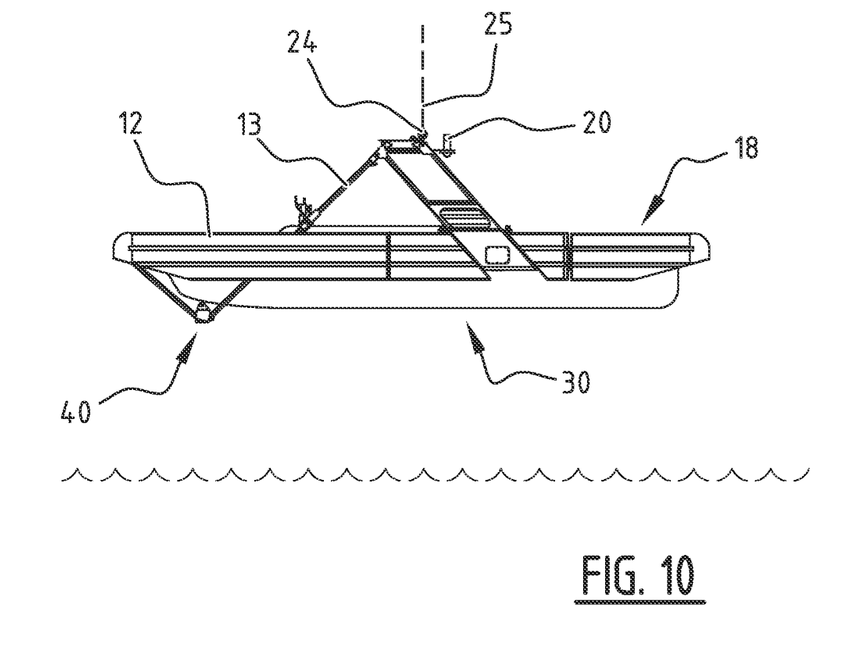

As shown in FIGS. 8A and 8B, the fixation members 14 are movable relative to the cradle structure 11. The fixation members 14 thereby move towards the side walls 32 of the hull 33 of the surface vehicle 30, when they are switched to the active state (see FIG. 8A), and move away from the side walls 32 of the surface vehicle 30 when they are switched to the inactive state (see FIG. 8B). In order to move the fixation members 14, each fixation member 14 comprises a hydraulic or pneumatic member 16 which is configured to move the respective fixation member 14 towards and away from its respective side wall 32 of the hull 33 of the surface vehicle 30 and thereby, upon moving the magnets towards its respective side wall 32, press the respective magnet 15 with force against the respective side wall 32, so that the fixation members 14 are capable of supporting the weight of the surface vehicle 30.

Figure 4:
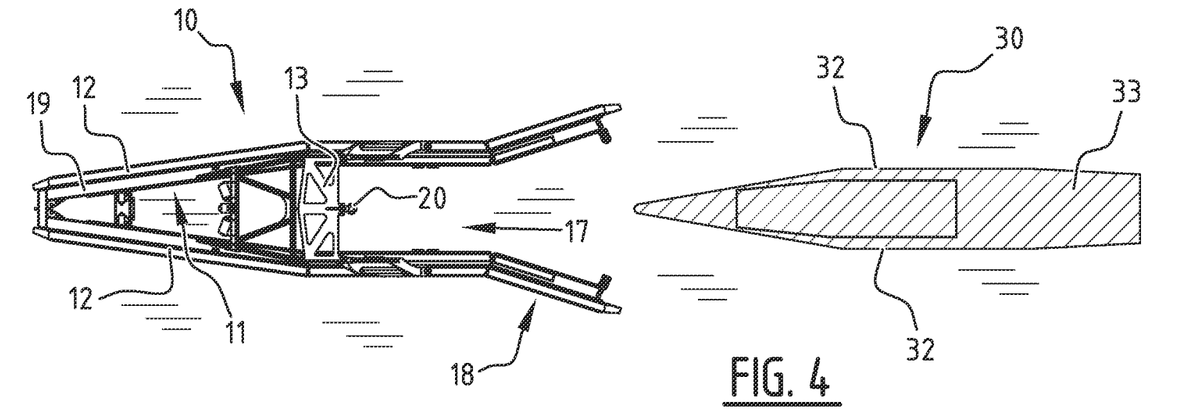
FIG. 4 shows a top view of the system as shown in FIG. 1 including a surface vehicle to be received in the cradle structure of the system.
Figure 5:
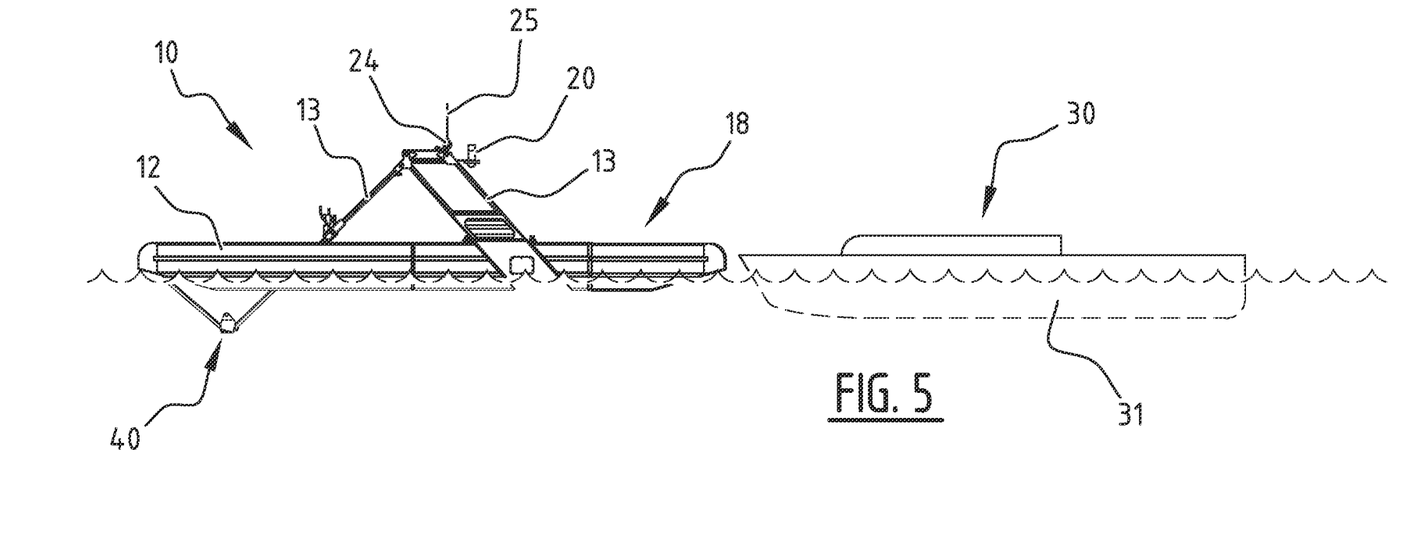
FIG. 5 shows a side view of the system as shown in FIG. 4.
Figure 6:
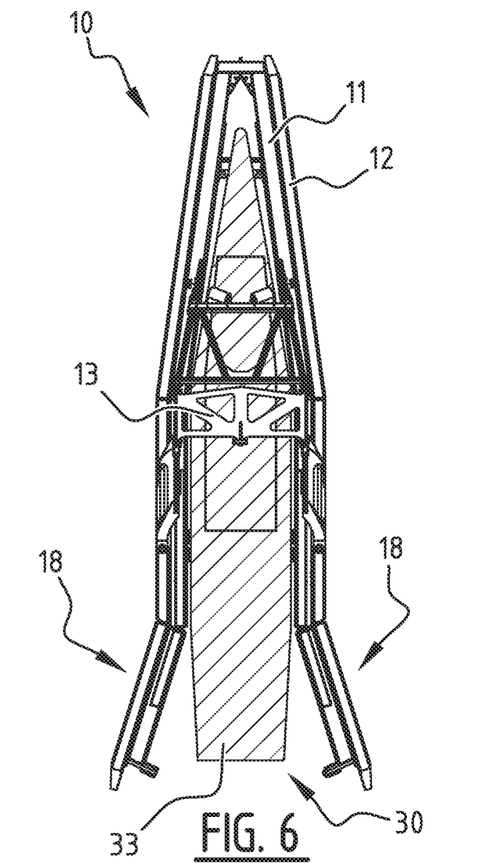
FIGS. 6 and 7 show top views of the system as shown in FIG. 1 at different stages of the launch and recovery process, respectively.
Figure 7:
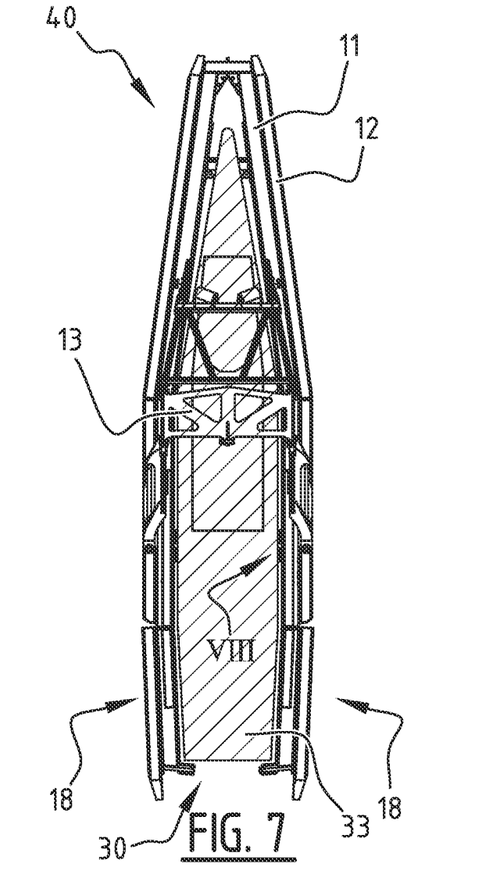

As best shown in FIGS. 4, 6 and 7, the cradle structure 11 is shaped substantially in accordance with the exterior shape of the surface vehicle 30 to be received therein and comprises a surface vehicle entrance opening 17 on one end. It further comprises door-like members 18 connected to ends of elongate wall-like members of the cradle structure 11, which define the entrance opening 17, also called gate 18, which is configured to partially close off the entrance opening 17.

Furthermore, the cradle structure 11 has guiding means 19. These guiding means 19 are configured to guide the surface vehicle 30 into the cradle structure 11 to ensure a proper engagement between the fixation members 14 and the surface vehicle 30. Depending upon the type of surface vehicle 30 to be received in the receiving space of the cradle structure 11, the guiding means 19 may partially support the weight of the surface vehicle 30.

Figures 1, 2:
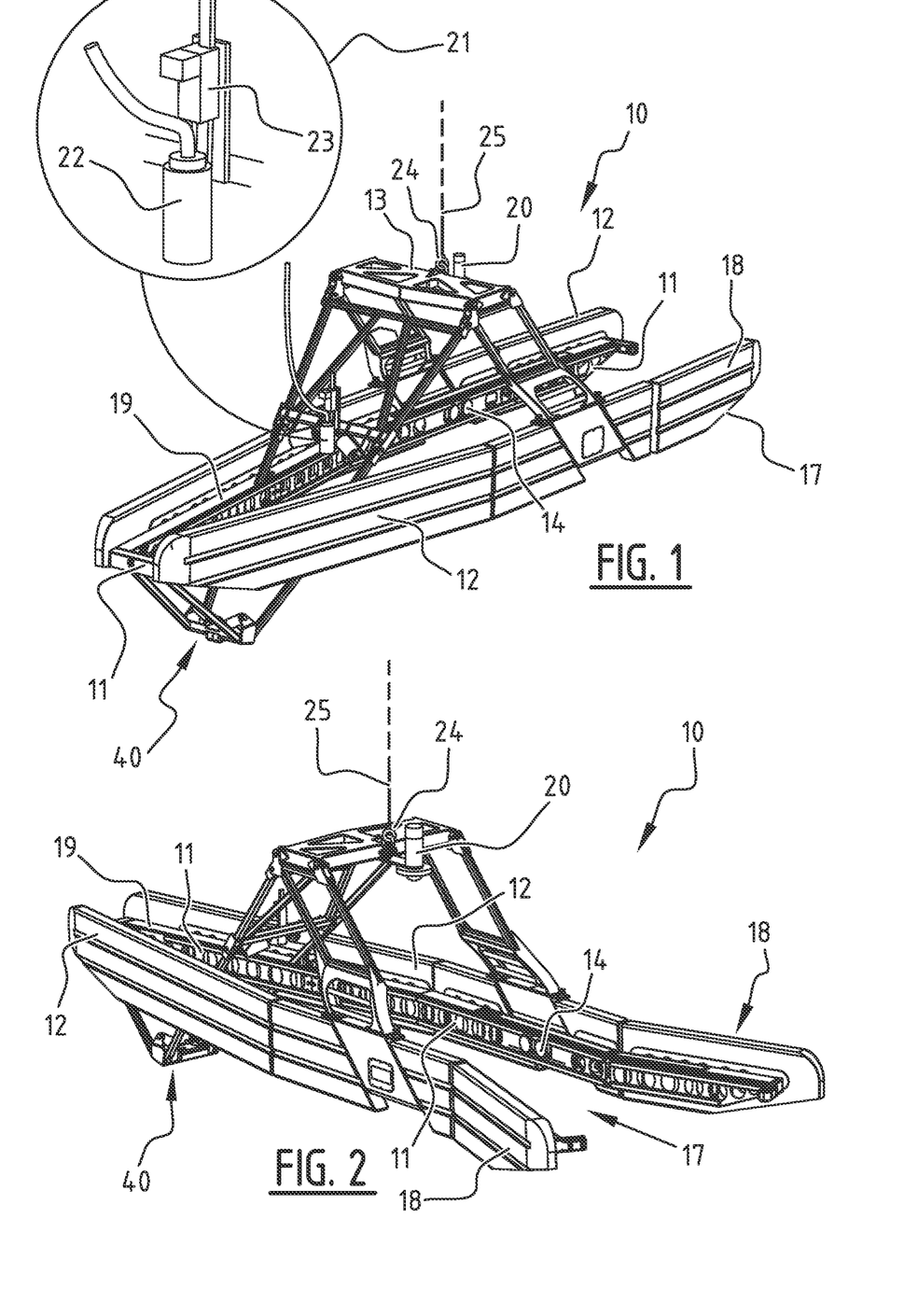
FIG. 1 shows a perspective front view of a preferred embodiment of the system for launch and recovery of surface vehicles.
FIG. 2 shows a perspective rear view of the system as shown in FIG. 1.

As best shown in FIG. 2, the system 10 further has a homing system 20 which is configured to emit a homing signal for the surface vehicle 30. In this way, the surface vehicle 30 can estimate the position of the system 10 and therewith the position of the receiving space of the cradle structure 11. Thereto, the homing system 20 contains communication means for transmitting and/or receiving electromagnetic waves to and from the surface vehicle 30, respectively, which are arranged to guide the surface vehicle 30 to the cradle structure 11 of system 10.

As best shown in FIG. 1, the system 10 contains an energy replenishment system 21 configured to replenish the surface vehicle 30. This energy replenishment system 21 is specifically configured to be operable by automated or remote control. Thereto, the energy replenishment 21 system is comprised of a connector 22 for connecting a supply of the energy replenishment system to the surface vehicle 30, and an actuator 23 for moving and controlling the connector towards an energy replenishment inlet of the surface vehicle 30. The connector 22 is rotationally symmetric and the connector 22 and the actuator 23 are configured such that only a vertical movement is needed to connect the connector to the inlet of the surface vehicle. Consequently, the surface vehicle 30 can approach and dock with the energy replenishment system 21, irrespective of its orientation in the XY-plane, i.e. the plane spanned by the length and width axes of the surface vehicle 30.

The energy replenishment system 21 may comprise a fossil fuel station, wherein the connector 22 comprises is a fuel nozzle. Alternatively, the energy replenishment system 21 may comprise a wired or wireless, for instance inductively coupled, electric charging station, wherein the connector comprises a power plug or induction coil.

As best shown in FIGS. 1 and 2, the system 10 has tethering means for tethering the system 10 to a host vessel. The tethering means are comprised of a coupling member 24, which is used for coupling a tether line 25 to the lifting structure 13. Specifically, the exterior shape of the coupling member 24 corresponds to an interior shape of a receiving member of a davit on the host vessel, or vice versa, so that the cradle structure 11 is lockable against rotational movement around the tether line 5 upon lifting the cradle structure with or without the surface vehicle 30. As a result, the cradle structure 11 has a fixed predetermined XY-orientation with respect to the host vessel when lifted. In this way, since the surface vehicle 30 inside the cradle structure 11 also has this fixed predetermined XY-orientation with respect to the host vessel when it is lifted out of the water, the surface vehicle 30 can be placed onto the deck of the host vessel without the need to carry out complex maneuvering steps to correctly position the surface vehicle 30 onto the deck of the host vessel. As a further advantage, since the XY-orientation of the surface vehicle 30 is fixed, multiple surface vehicles 30 can be arranged quickly and efficiently on the deck of the host vessel after recovery and lifted from the deck quickly and efficiently during deployment of the surface vehicles onto the water. In this way, the deck space required for parking/storing surface vehicles 30 is minimized, which is very beneficial since space is at a premium aboard a multi-tasked vessel, such as a combat ship. The tethering means thereby contribute to a quick, reliable and efficient launch and recovery operation.

Although FIGS. 1 to 10 show an embodiment wherein a bottomless channel is formed by two substantially parallel cradle structure side walls, the invention is not limited to this preferred embodiment. For instance, the bottomless cradle structure 11 may be formed by being much shorter than the surface vehicle 30 to be received instead of being configured to fully enclose the surface vehicle 30. Alternatively, e.g. in the case of narrower surface vehicles 30, the cradle structure 11 may contain an open channel at its bottom which is narrower than the channel as shown in FIGS. 1 to 10, as long as contact/interaction between a submersed portion 31 of the surface vehicle 30 and the cradle structure 11 is avoided.

The present invention is not limited to the above described preferred embodiment; the rights are defined by the claims, within the scope of which many modifications can be envisaged.

The invention claimed is:

1. A system for launch and recovery of a surface vehicle, comprising:
   a floating cradle structure configured to form a receiving space for receiving the surface vehicle therein and to support the surface vehicle when lifted into or out of the water during launch or recovery of the surface vehicle, respectively,
   wherein the receiving space is defined by two elongate wall-like elements of the cradle structure which extend substantially parallel to each other and extend towards each other at a front end of the cradle structure, wherein the cradle structure is devoid of any structural element extending between the wall-like elements on its underside, such that contact between a submersed portion of the surface vehicle and the cradle structure is avoided upon receiving the surface vehicle, wherein the cradle structure further comprises on its inside a fixation member configured to engage a side wall of a hull of the surface vehicle and being switchable between an active state, in which the surface vehicle is fixated relative to the cradle structure, and an inactive state, in which the surface vehicle is movable relative to the cradle structure, wherein a fixating force of the fixation member in the active state is such that the fixation member can support the weight of the surface vehicle, the fixation member thereby functioning as a supporting member which is capable of supporting the full weight of the surface vehicle when lifted into or out of the water during launch or recovery of the surface vehicle, respectively.

2. The system according to claim 1, wherein the cradle structure comprises buoyant members on its outside along at least a part of its periphery.

3. The system according to claim 1, further comprising a lifting structure attached to the cradle structure configured to lift the cradle structure with or without the surface vehicle.

4. The system according to claim 1, wherein the fixation member comprises a magnet configured to engage the side wall of the hull of the surface vehicle in the active state.

5. The system according to claim 4, wherein the fixation member is movable relative to the cradle structure, wherein the fixation member moves towards the side wall of the hull of the surface vehicle when it is switched to the active state, and moves away from the side wall of the surface vehicle when it is switched to the inactive state.

6. The system according to claim 5, wherein the fixation member comprises a hydraulic or pneumatic member configured to move the fixation member towards and away from the side wall.

7. The system according to claim 1, wherein the cradle structure is shaped substantially in accordance with an exterior shape of the surface vehicle to be received and comprises a surface vehicle entrance opening on one end; the system further comprising a gate configured to at least partially close off the entrance opening.

8. The system according to claim 1, wherein the cradle structure further comprises guiding means configured to guide the surface vehicle into the cradle structure, so as to ensure a proper engagement between the fixation member and the surface vehicle.

9. The system according to claim 8, wherein the guiding means at least partially support the weight of the surface vehicle.

10. The system according to claim 1, further comprising a homing system configured to emit a homing signal for the surface vehicle to estimate the system's position, said homing system comprising communication means for transmitting and/or receiving electromagnetic waves to and from the surface vehicle, respectively, and configured to guide the surface vehicle to the system.

11. The system according to claim 1, further comprising an energy replenishment system configured to replenish the surface vehicle and operable by automated or remote control.

12. The system according to claim 11, wherein the energy replenishment system comprises a connector for connecting a supply of the energy replenishment system to the surface vehicle and an actuator for moving and controlling the connector towards an energy replenishment inlet of the surface vehicle.

13. The system according to claim 12, wherein the connector and actuator are configured to permit the surface vehicle to approach and dock with the energy replenishment system from any angle.

14. The system according to claim 11, wherein the energy replenishment system comprises an electric charging station.

15. The system according to claim 14, wherein the charging station is configured for inductive charging.

* * * * *